United States Patent [19]

Ness

[11] Patent Number: 5,644,294

[45] Date of Patent: Jul. 1, 1997

[54] RESCUE SUPPORT APPARATUS

[76] Inventor: Ronald J. Ness, 30041 Del Mar Ct., Temecula, Calif. 92592

[21] Appl. No.: 696,302

[22] Filed: Aug. 13, 1996

[51] Int. Cl.$^6$ .................................................. G08B 21/00
[52] U.S. Cl. .................... 340/540; 340/521; 340/691; 206/570
[58] Field of Search .................................. 340/540, 521, 340/691, 573, 628, 629, 630, 690, 567, 571, 632, 634, 331; 206/803, 570, 573

[56] References Cited

U.S. PATENT DOCUMENTS

| | | | |
|---|---|---|---|
| 5,153,561 | 10/1992 | Johnson | 340/571 |
| 5,298,883 | 3/1994 | Pilney et al. | 340/573 |
| 5,309,145 | 5/1994 | Branch et al. | 340/540 |
| 5,371,489 | 12/1994 | Carroll et al. | 340/565 |
| 5,515,974 | 5/1996 | Higson | 206/570 |

*Primary Examiner*—Jeffery Hofsass
*Assistant Examiner*—Anh La
*Attorney, Agent, or Firm*—Gene Scott; Patent Law & Venture Group

[57] ABSTRACT

A disaster support apparatus provides a compact enclosure within which a power supply energizes a circuit providing emergency lighting, radio wave and audible beacons activated by violent earthquake motion, a low level illumination for those attempting to find the apparatus in case of a flood or cave-in, a series of prerecorded medical advice statements activated at the press of a selector switch, a radio receiver, air sampling sensors, tied into the audible alarm, and storage capacity for medical and sustenance supplies and other equipment. The unit provides a wall attachment feature for mounting the unit in its standby mode, but the unit may be removed for portable use.

12 Claims, 4 Drawing Sheets

5,644,294

RESCUE SUPPORT APPARATUS

BACKGROUND OF THE INVENTION

1. Field of the Invention

This invention relates generally to an electrical and electronic rescue support apparatus, and more particularly to a portable apparatus providing a range of rescue support features for lending manual as well as automatic support to those involved in a disaster of any kind including earthquake, fire, flood and simple medical emergencies.

2. Description of Related Art

The following art defines the present state of this field:

Yang, U.S. Pat. No. 5,119,280 describes a multi-purpose flashlight comprising a casing which defines a battery chamber for holding a battery set and a storage chamber for holding medicines or small accessories, a back cover detachably attached to said casing at the back which has magnets for mounting on a metal and a socket for connecting to an external power supply, an alarm and light source set detachably attached to said casing at the front which comprises a buzzer, an electronic circuit and a lamp holder for producing audio and visual signal, and a projector detachably attached to said alarm and light source set at the front and moved to control the operation of said electronic circuit.

Harshaw et al., U.S. Pat. No. 5,267,147 describes a computerized checklist system for use in the medical field preferably comprises a checklist unit adapted to be held in an operator's hand and a cradle for supporting the checklist unit. Each of the components includes a microprocessor for controlling the operations. An optical link is provided to transmit data between the devices. The checklist unit includes suitable memory for storing alphanumeric checklist data including a sequence of checklist items.

Battaglia, U.S. Pat. No. 5,088,037 describes a rescue administration aid device that is portable and may be worn on a rescuer's wrist. It is operative in response to parameter entries by the rescuer according to the victim's condition to provide sequential procedural displays of medical standard rescue steps for assisting the rescuer in carrying out the correct rescue operation.

Pierce, U.S. Pat. No. 4,863,385 describes a compact, portable, computer controlled device which provides timing and sequence guidance for helping the CPR rescuer remember what actions are required, and when the association tasks need to be performed. Audible buzzers, synthetic voices, and indicator lamps guide the rescuer in the performance of CPR.

Dormond et at., U.S. Pat. No. 4,839,822 describes and expert system which provides one or more suggested treatments for a patient with physical trauma is disclosed. The system includes a computing device having a memory, a plurality of data bases in the memory, an application program and an inference engine program. The data bases include graphical illustrations of different types of physical trauma, and a knowledge base which contains treatment information.

Parker et al., U.S. Pat. No. 4,588,383 describes an interactive trainer/prompter device serves to provide visual and synthetic-speech prompts to a human operative to achieve a task that requires skills that may be critical, but infrequently required. The device has a plurality of actuator push buttons and indicator lamps, and provides synthetic voice prompts.

Sinay, U.S. Pat. No. 4,290,114 describes a computer-aided health care system for use by a paramedic. Findings taken from the patient by the paramedic are assigned numerical codes by use of preprinted forms. The paramedic uses a keyboard to enter the numerical codes into a fixed purpose computer. The computer compares the findings with a number of disease definitions stored in its memory. The computer then operates a printer to list numerical codes for all treatments to be administered. The paramedic uses these codes to enter a treatment and diagnostic manual which gives the name of the disease and specific instructions for its treatment, in the language of the paramedic.

The prior art teaches the use of visual and audible alarms, portable apparatus units capable of presenting prerecorded medical advice, and of lighting devices for emergency use. However, the prior art does not teach that a combination apparatus providing emergency lighting, motion sensing lighting, radio beacon, radio receiver, medical advice capability and medical and sustenance supplies storage. The present invention fulfills these needs and provides further related advantages as described in the following summary.

SUMMARY OF THE INVENTION

The present invention teaches certain benefits in construction and use which give rise to the objectives described below.

The present invention is an emergency apparatus for providing the needs of persons when an emergency such as flood, earthquake, cave-in, fire, medical problems and such occur.

An primary objective of the present invention is to provide such an apparatus for providing emergency lighting. Another objective is to provide radio and audible beacons for the case of entrapment of persons in an emergency. A further objective is to provide a smart circuit for the enablement of audible alarm signals in case of the fouling of the breathing air. Another objective is to provide medical statements in a step-by-step procedure for the guiding of personnel to apply first aid to stricken victims in an emergency situation. A final and important objective is to provide such an apparatus which also provides the storage of emergency items for use in an emergency.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE PREFERRED EMBODIMENT

Figure 1:
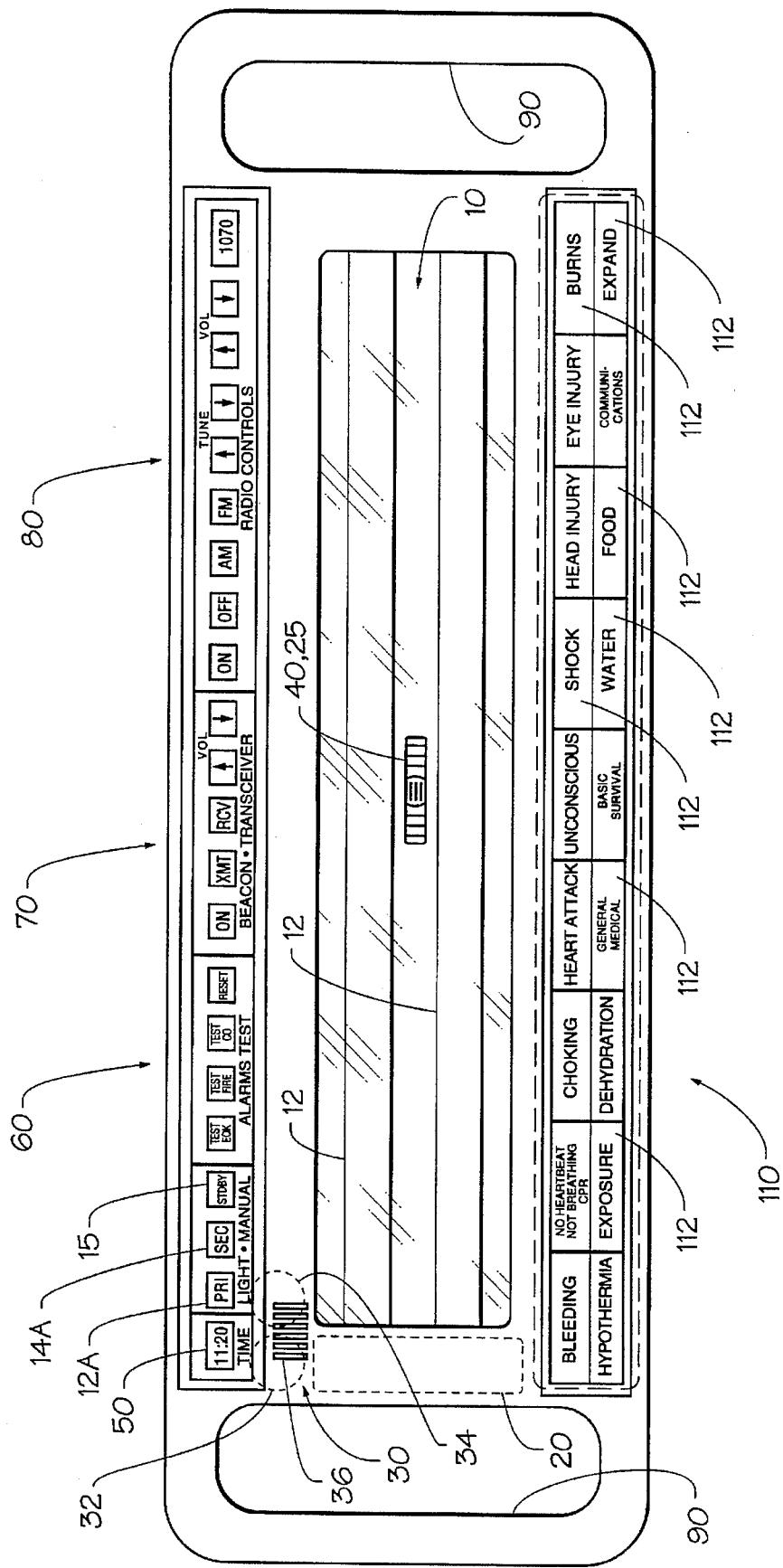
FIG. 1 is a front elevational view of the present invention showing various controls and features.
Figure 2:
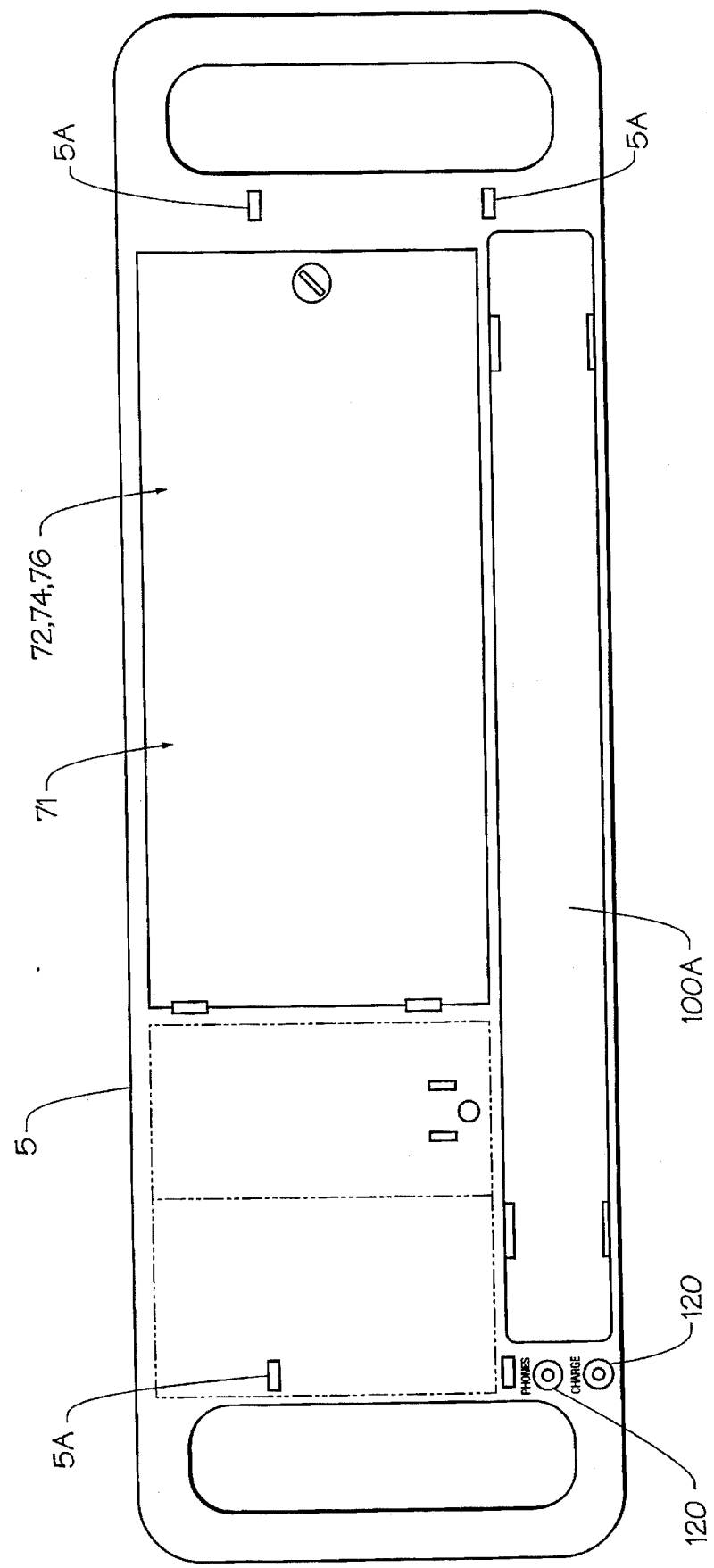
FIG. 2 is a rear elevational view showing further details of construction of the enclosure thereof.
Figure 3:
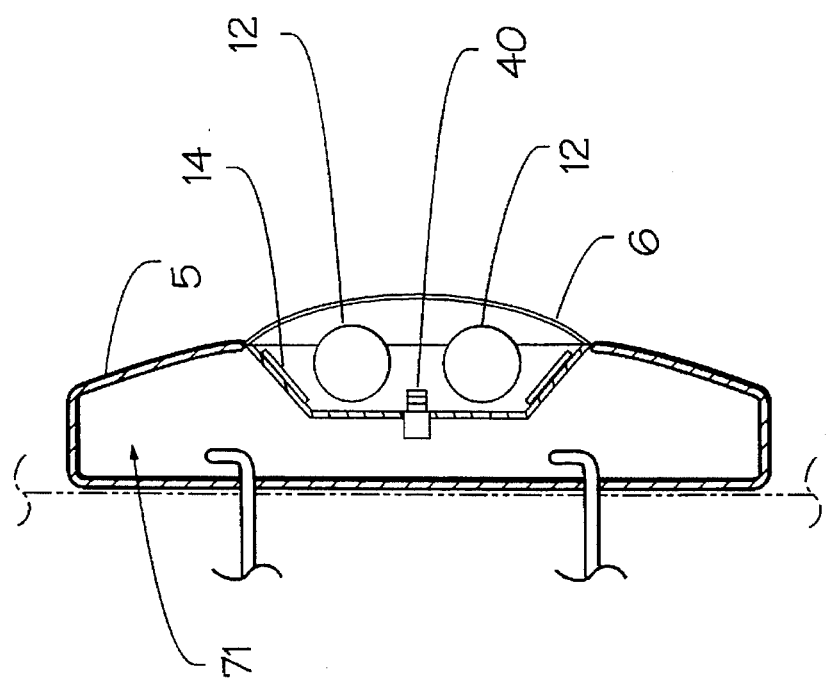
FIG. 3 is a side elevational view in cross-section thereof.
Figure 4:
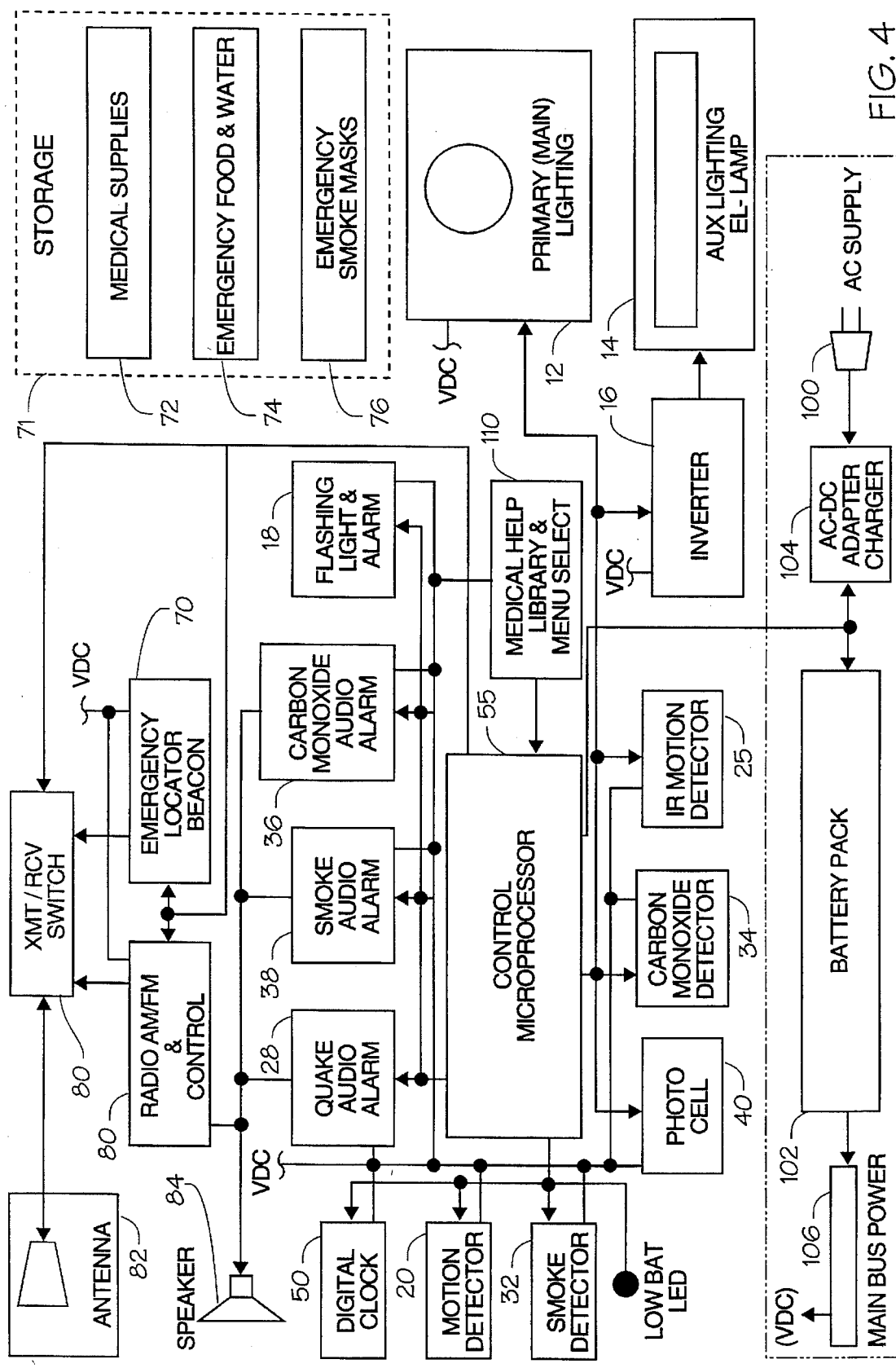
FIG. 4 is an electrical block diagram thereof.

The above described drawing figures illustrate the invention, a disaster support apparatus. The apparatus is intended to be mounted at a location favorable to access in case of an emergency. The device includes an enclosure 5, preferably molded out of a tough plastic polymer material and includes an integral means for illumination 10, as shown in FIGS. 1 and 3. Preferably, this illumination means includes a primary lighting means for relatively bright illumination 12 such as a fluorescent, incandescent or chemical lighting means and also an auxiliary lighting means for subdued, low energy use, illumination 14, preferably an electroluminescent lighting means requiring an inverter 16 (FIG. 4). The primary lighting means 12 is preferable an electrical circuit providing at least one fluorescent tube, and the auxiliary lighting means 14 is preferably at least one flat electroluminescent panel as best seen in FIG. 3 and may include a phosphorescent layer 11 in areas adjacent thereto. The latter provides non-powered lighting for up to 8 hours when the layer is activated. Preferably, the tubes and the panels are mounted in one face of the enclosure indicated by numeral 10 in FIG. 1. This face is preferably formed as a cavity and is preferably covered by a transparent outer cover 6 made of a tough material such as polycarbonate resin. The enclosure 5 preferably has a pair of spaced apart handles 90 molded integrally into the enclosure, and a mounting aperture means 5A formed in the enclosure 5 for hanging the apparatus on a support means, as shown in FIGS. 2 and 3. Preferably, the mounting means 5A includes at least two, and preferably four, small apertures for hanging the case against a wall having protruding therefrom, at least two hooks corresponding in size and spacing with the small apertures. Such a mounting means is specifically designed for quick and easy removal of the apparatus from the mount.

The illumination means, as defined above, is part of an electrical circuit means 2 of the apparatus which further includes a variety of elements providing substantial features in the invention. The circuit means 2 preferably includes a means for sensing an ambient lighting level 40 in the vicinity of the apparatus. Such a level sensing means 40 is preferably a photosensor or similar device for detecting the local illumination level and for producing an electrical signal corresponding thereto. A microprocessor controller 55 receives this signal and determines if the local illumination level is equal to or greater than a predetermined level. If it is not, the subdued illumination means 14 is energized. Thus the apparatus is able to provide lighting in case of a blackout or power failure. The apparatus further preferably includes a means for sensing motion 20 imparted to the apparatus. Such a motion sensing means 20 preferably includes a motion sensitive switch means such as a mercury switch or similar device sensitive to its own motion and capable of closing a set of electrical contacts (not shown) for producing an electrical signal corresponding to the motion. When motion beyond a certain preset determined magnitude is detected, the motion sensing means 20 is set into an alarm mode, thereby triggering certain actions, described below. The apparatus further preferably includes a means for sampling the air immediately adjacent to the apparatus. Such a sampling means preferably includes a carbon monoxide sensitive detector 34, and a smoke sensitive detector 32 of well known types commercially available, and may also include other detectors, such as those for carbon dioxide, radon, chlorine and other gases as the need may arise for various installation requirements. Such detectors are preferably interconnected within the circuit 2 for producing an electrical signal proportional to the magnitude of the detected gas species and for establishing certain alarm enablements.

The apparatus preferably includes a means for wave energy signal propagation 70 capable of generating an SOS locator beacon intermittent pulse output of such magnitude and frequency as to be detectable at least 100 miles from the apparatus. This beacon preferably also energizes an audible tone generated at selected frequent intervals.

Additionally, the apparatus preferably includes a means for wave energy wireless signal reception 80 such as a multi-band radio receiver. Alternately, instead of a simple receiver, the apparatus may include a two-way radio transceiver. In either case, the apparatus includes an antenna 82 for reception and transmission of wave energy signals.

The apparatus further preferably includes a means for dispensing medical and sustenance supplies 71 including, for instance, bandages, gauze pads, tape, scissors, first aid cream, pain reduction pills, salt pills, water purification pills, as an example of medical supplies 72, and water, food bars, dried meat stuffs, concentrated food tablets, toilet paper, spare batteries, and at least one insulating blanket with a radiation reflecting surface as an example of emergency food and water and other supplies 74. The dispensing means additionally may store a garb means for excluding poisonous gases during breathing, such as gas masks 76. In case of a fire the smoke alarm would trigger and personnel would then don the masks 76 prior to exiting.

An important feature of the apparatus is the included means for audible presentation of medical advice 110 through a loudspeaker 84. Such a presentation means 110 preferably includes an archive of stored verbal statements. Such statements may be on magnetic audio tape or other means such as a solid-state memory device (not shown). A plurality of push buttons 112 enables the presentation of any selected one of the stored statements. Preferably, advice statements for a number of medical conditions such as bleeding, hypothermia, choking, dehydration, heart attack, shock, burns, and unconsciousness, among others, are stored in the archive. Other statements might include topics such as basic survival, general medical issues, communications, and moral building statements.

The circuit 2 further includes a portable means for providing electrical power 100 for use in the circuit 2. This power means 100 provides electrical current for operating the illumination, motion detection, air sampling, signal propagation, signal reception, alarm means, medical advice means, etc. The power source is preferably a rechargeable battery 102 with charger/adapter 104 and preferably sets voltage on a system bus 106 for distribution to the various elements of the circuit 2.

In operation, the present invention may be connected to a 115 VAC, 60 Hz power source. The charger/adapter 104 maintains the battery 102 at full charge at all times. The charger/adapter 104 is also able to accept 220 VAC, 50 Hz as an input. The apparatus may be used in structures and areas not convenient to AC power. The battery 102 is of a long life type capable of extended operation not supported by any outside power provision. The microprocessor controller 55 provides decision making logic so that, as described above, when the general illumination level in the vicinity of the apparatus drops below a set threshold, the auxiliary lighting panels 14 are energized. This provides visibility in the case of power loss in an interior space within a building but also acts as a night light for convenience. A motion detecting means 25, such as an infra-red motion sensor is connected to the circuit. When lighting levels are below the designated threshold the detector 25 senses motion and provides low level lighting. In case of an earthquake, the apparatus senses the motion of the building or structure to which it is attached and immediately provides full light output from the primary light means 12 while power is still provided from the building power bus. An earthquake emergency also produces an audible alarm signal from quake audio alarm 28. When building power is lost, the controller 55 shuts down the primary lighting means 12 and brings up the auxiliary lighting means 14 in order to conserve battery power and extend battery life. Should smoke or carbon monoxide gases be detected (or other gases in accordance with the sensors fitted to the particular unit) an audible alarm is enabled. As shown in FIG. 4, for carbon monoxide audible alarm 36 is enabled, while for smoke, alarm 38 is enabled by controller 55. These alarm signals are produced by loudspeaker 84. The audible signals for quake CO2 and smoke offer differing sounds so that those within earshot immediately know the nature of the emergency. In the case of smoke, assuming that a fire is underway, if the apparatus is positioned near an exit, the audible alarm is able to help those in the process of exiting the building, find the exit by following the alarm sound. All alarm functions produce a flashing light, enabled by flashing light alarm 18, in conjunction with the audible tone.

In the case of a cave-in, or where personnel are trapped within the building, as for instance, after a severe earth quake, the circuit 2 may be programmed to manually, or automatically enable the radio wave beacon 70. In this way, even if all personnel are disabled or unconscious, a search team may be able to find the apparatus and those individuals near it. In the case where personnel are trapped but not unconscious, the apparatus may be of great help to them. For example, the radio receiver 80 will provide news of events outside the building, such as what search efforts are being conducted. The medical and sustenance supplies dispensing means 70 is preferably a compartment within the apparatus where these supplies are stored and may be accessed. In the case of an extended entrapment, the medical supplies, food and water may enable survival. In the case where personnel are injured, the means for audible presentation of medical advice 110 provides help to non-medically trained personnel in the treatment of various common emergency problems through the application of first aid procedures. By simply depressing one of the push buttons 112 a person attempting to apply first aid is conducted, step-by-step, through an appropriate procedure. The apparatus provides a clock 50, useful for pulse readings and other medical procedures and findings, such as the elapsed time between pains or convulsions.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A disaster support apparatus providing:

an enclosure, and in the enclosure;

a circuit providing, in operational interconnection, a primary means for illumination;

an auxiliary means for illumination;

a means for sensing an ambient lighting level;

a means for detecting motion of the enclosure;

a means for air monitoring;

a means for sensing motion of objects near the apparatus;

an audible alarm means;

a means for wave energy wireless signal propagation;

a means for wave energy wireless signal reception;

a means for audible presentation of recorded medical advice;

a portable means for providing electrical power to the circuit for operation thereof, and;

a microprocessor adapted to control the circuit such that with the ambient lighting level below a designated level as determined by the ambient lighting level sensing means, and with a sensing of an object near the apparatus, the auxiliary illumination means is energized, and further, with a gas level of a selected gas detected above a designated level by the air monitoring means, or with a motion of the apparatus, having a magnitude above a designated level, being sensed by the enclosure motion sensing means, or with smoke being detected by the air monitoring means, an audible alarm is produced by the audible alarm means, and a wave energy alarm signal is transmitted;

and the apparatus further including a means for storing medical and sustenance supplies;

and a garb means for excluding poisonous gases during breathing.

2. The apparatus of claim 1 wherein the audio alarm means includes a loudspeaker.

3. The apparatus of claim 1 wherein the means for sensing the ambient lighting level includes a photosensor.

4. The apparatus of claim 1 wherein the means for air sampling includes at least a carbon monoxide sensitive detector, and a smoke sensitive detector.

5. The apparatus of claim 1 wherein the means for motion detection of the apparatus includes a motion sensitive switch means.

6. The apparatus of claim 1 wherein the means for illumination includes a relatively bright primary lighting means and a relatively subdued auxiliary lighting means.

7. The apparatus of claim 1 wherein the supplies include bandages, gauze pads, tape, scissors first aid cream, pain reduction pills, salt pills, water purification pills, water, food bars, dried meat stuffs, concentrated food tablets, toilet paper, spare batteries, and at least one insulating blanket with radiation reflecting surface.

8. The apparatus of claim 1 wherein the power means includes a rechargeable battery and an adapter/charger for accepting alternating current and maintaining a full charge in the battery.

9. The apparatus of claim 1 wherein the means for wave energy wireless signal propagation generates a locator beacon intermittent pulse output of such magnitude and frequency as to be detectable at least 100 miles from the apparatus.

10. The apparatus of claim 7 wherein the enclosure includes a pair of integral spaced apart handles, and a mounting aperture means formed in the case for hanging the apparatus on a support means and further includes a space for storing the supplies.

11. The apparatus of claim 1 further including a phosphorescent layer adjacent to the primary means for illumination, the phosphorescent layer being activated by ambient light and light from the primary illumination means.

12. The apparatus of claim 11 wherein the enclosure further includes a cavity for mounting the primary and secondary lighting means and the phosphorescent layer, the cavity covered by a transparent cover of a tough material.

* * * * *